(12) United States Patent
Lin

(10) Patent No.: US 8,902,955 B2
(45) Date of Patent: Dec. 2, 2014

(54) HIGH-DEFINITION MULTIMEDIA INTERFACE DATA TRANSCEIVING APPARATUS

(71) Applicant: Shih-Min Lin, New Taipei (TW)

(72) Inventor: Shih-Min Lin, New Taipei (TW)

(73) Assignee: ASMedia Technology Inc., New Taipei (TW)

( * ) Notice: Subject to any disclaimer, the term of this patent is extended or adjusted under 35 U.S.C. 154(b) by 101 days.

(21) Appl. No.: 13/691,839

(22) Filed: Dec. 2, 2012

(65) Prior Publication Data
US 2013/0142229 A1 Jun. 6, 2013

(30) Foreign Application Priority Data
Dec. 6, 2011 (TW) .............................. 100144854 A

(51) Int. Cl.
*H04B 1/38* (2006.01)
*H04B 1/44* (2006.01)
*H04L 25/02* (2006.01)

(52) U.S. Cl.
CPC .............. *H04B 1/44* (2013.01); *H04L 25/0278* (2013.01); *H04L 25/0272* (2013.01)
USPC ....................................................... 375/219

(58) Field of Classification Search
USPC ....................................................... 375/219
See application file for complete search history.

(56) References Cited

U.S. PATENT DOCUMENTS

| | | | | |
|---|---|---|---|---|
| 4,710,919 | A * | 12/1987 | Oliver et al. | 370/242 |
| 8,122,160 | B2 * | 2/2012 | Lee et al. | 710/14 |
| 8,577,297 | B2 * | 11/2013 | Chiang | 455/63.1 |
| 2008/0304184 | A1 * | 12/2008 | Biskeborn et al. | 360/245.8 |
| 2010/0150213 | A1 * | 6/2010 | Huang et al. | 375/219 |
| 2010/0208778 | A1 * | 8/2010 | Kim | 375/219 |
| 2011/0081874 | A1 * | 4/2011 | Chiang | 455/84 |
| 2011/0302331 | A1 * | 12/2011 | Lee et al. | 710/14 |
| 2012/0057262 | A1 * | 3/2012 | Yeh et al. | 361/58 |
| 2012/0169438 | A1 * | 7/2012 | Nandy et al. | 333/24 C |
| 2013/0010855 | A1 * | 1/2013 | Zerbe et al. | 375/232 |

FOREIGN PATENT DOCUMENTS

| | | |
|---|---|---|
| CN | 101535922 | 9/2012 |
| WO | 2008136811 | 11/2008 |

* cited by examiner

*Primary Examiner* — Santiago Garcia
(74) *Attorney, Agent, or Firm* — Jianq Chyun IP Office

(57) ABSTRACT

A high-definition multimedia interface (HDMI) data transceiving apparatus is disclosed. The HDMI data transceiving apparatus includes a data receiver and a data transmitter. The data transmitter includes a first impedance-providing device and a second impedance-providing device. The data transmitter has a first data transmission terminal and a second data transmission terminal. The first data transmission terminal and the second data transmission terminal are coupled to the data receiver through a first transmission line and a second transmission line, respectively. The data transmitter respectively transmits first data and second data to the data receiver. The first impedance-providing device and the second impedance-providing device absorb a reflected wave generated by the HDMI data transceiving apparatus when the first data and the second data are transmitted.

7 Claims, 2 Drawing Sheets

HIGH-DEFINITION MULTIMEDIA INTERFACE DATA TRANSCEIVING APPARATUS

CROSS-REFERENCE TO RELATED APPLICATION

This application claims the priority benefit of Taiwan application serial no. 100144854, filed on Dec. 6, 2011. The entirety of the above-mentioned patent application is hereby incorporated by reference herein and made a part of this specification.

BACKGROUND OF THE INVENTION

1. Field of the Invention

The disclosure generally relates to a multimedia interface data transceiving apparatus, and more particularly, to a high-definition multimedia interface (HDMI) data transceiving apparatus.

2. Description of Related Art

High-definition multimedia interface (HDMI) is a standard for transmitting digital television audiovisual signals from a digital visual disk (DVD) player, a set-top box, or any other audiovisual source to a television set, a projector, a monitor, or any other video display apparatus. HDMI supports high-quality multi-channel audio data and many standard and high-definition (HD) electronic video formats.

In a conventional HDMI data transceiving apparatus, when a data transmitter transmits data to a data receiver, the data transmitter receives a control signal; according to the received control signal, the data transmitter determines to turn on or off a switch and thereby transmits the data to the data receiver. When the switch is turned off, the data receiver may receive high-definition data because no current runs from the reference power supply to the reference ground terminal. In other words, the voltage level of the data receiver is pulled up to the level of the reference power supply.

By contrast, when the switch is turned on, a current runs from the reference power supply to the reference ground terminal through a transmission line and the switch, and the resultant voltage drop at the data receiver renders the difference between the voltage level of the data receiver and that of the reference ground terminal. Accordingly, the data receiver cannot receive complete high-definition data.

SUMMARY OF THE INVENTION

The disclosure provides a high-definition multimedia interface (HDMI) data transceiving apparatus including a data receiver and a data transmitter. The data transmitter has a first data transmission terminal and a second data transmission terminal. The first data transmission terminal and the second data transmission terminal are coupled to the data receiver respectively through a first transmission line and a second transmission line. The data transmitter respectively transmits first data and second data to the data receiver. The data transmitter includes a first impedance-providing device and a second impedance-providing device. The first impedance-providing device has a first terminal and a second terminal, and the first terminal of the first impedance-providing device is coupled to the first data transmission terminal of the data transmitter. The second impedance-providing device has a first terminal and a second terminal, the first terminal of the second impedance-providing device is coupled to the second data transmission terminal of the data transmitter, and the second terminal of the second impedance-providing device is coupled to the second terminal of the first impedance-providing device.

According to an embodiment of the disclosure, the data transceiving apparatus further includes an impedance detector that is coupled to the data transmitter. The impedance detector generates a detection result through detecting the impedance on the first transmission line and the impedance on the second transmission line. The data transmitter receives the detection result; according to the detection result, the data transmitter adjusts the impedance provided by the first impedance-providing device and the impedance provided by the second impedance-providing device.

According to an embodiment of the disclosure, the data transmitter further includes a first switch, a second switch, and a current source. The first switch has a first terminal, a second terminal, and a control terminal. The first terminal of the first switch is coupled to the first data transmission terminal of the data transmitter, and the first switch is turned on or off according to a first control signal received by the control terminal of the first switch. The second switch has a first terminal, a second terminal, and a control terminal. The first terminal of the second switch is coupled to the second data transmission terminal of the data transmitter, the second terminal of the second switch is coupled to the second terminal of the first switch, and the second switch is turned on or off according to a second control signal received by the control terminal of the second switch. The current source is serially connected between a reference ground terminal and the second terminals of the first switch and the second switch. Here, the current source sinks a reference current from the second terminals of the first switch and the second switch to the reference ground terminal.

According to an embodiment of the disclosure, the on/off states of the first switch and the second switch are reverse to each other.

According to an embodiment of the disclosure, the phases of the first control signal and the second control signal are reverse to each other.

According to an embodiment of the disclosure, the impedance provided by the first impedance-providing device is greater than the impedance on the first transmission line, and the impedance provided by the second impedance-providing device is greater than the impedance on the second transmission line.

According to an embodiment of the disclosure, the impedance provided by the first impedance-providing device is 4 times the impedance on the first transmission line, and the impedance provided by the second impedance-providing device is 4 times the impedance on the second transmission line.

According to an embodiment of the disclosure, the data receiver includes a third impedance-providing device and a fourth impedance-providing device. The third impedance-providing device is coupled between the first transmission line and the reference power supply. The fourth impedance-providing device is coupled between the second transmission line and the reference power supply.

As described above, in the disclosure, the first impedance-providing device and the second impedance-providing device are serially connected between the first data transmission terminal and the second data transmission terminal of the data transmitter, and the first data transmission terminal and the second data transmission terminal of the data transmitter are coupled to the first transmission line and the second transmission line, respectively. Since reflected waves generated by the HDMI data transceiving apparatus during data transmission are absorbed by the first impedance-providing device and the second impedance-providing device, the data transmitted by the HDMI data transceiving apparatus are less likely to be distorted.

These and other exemplary embodiments, features, and aspects of the disclosure will be described and become more apparent from the detailed description of exemplary embodiments when read in conjunction with accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
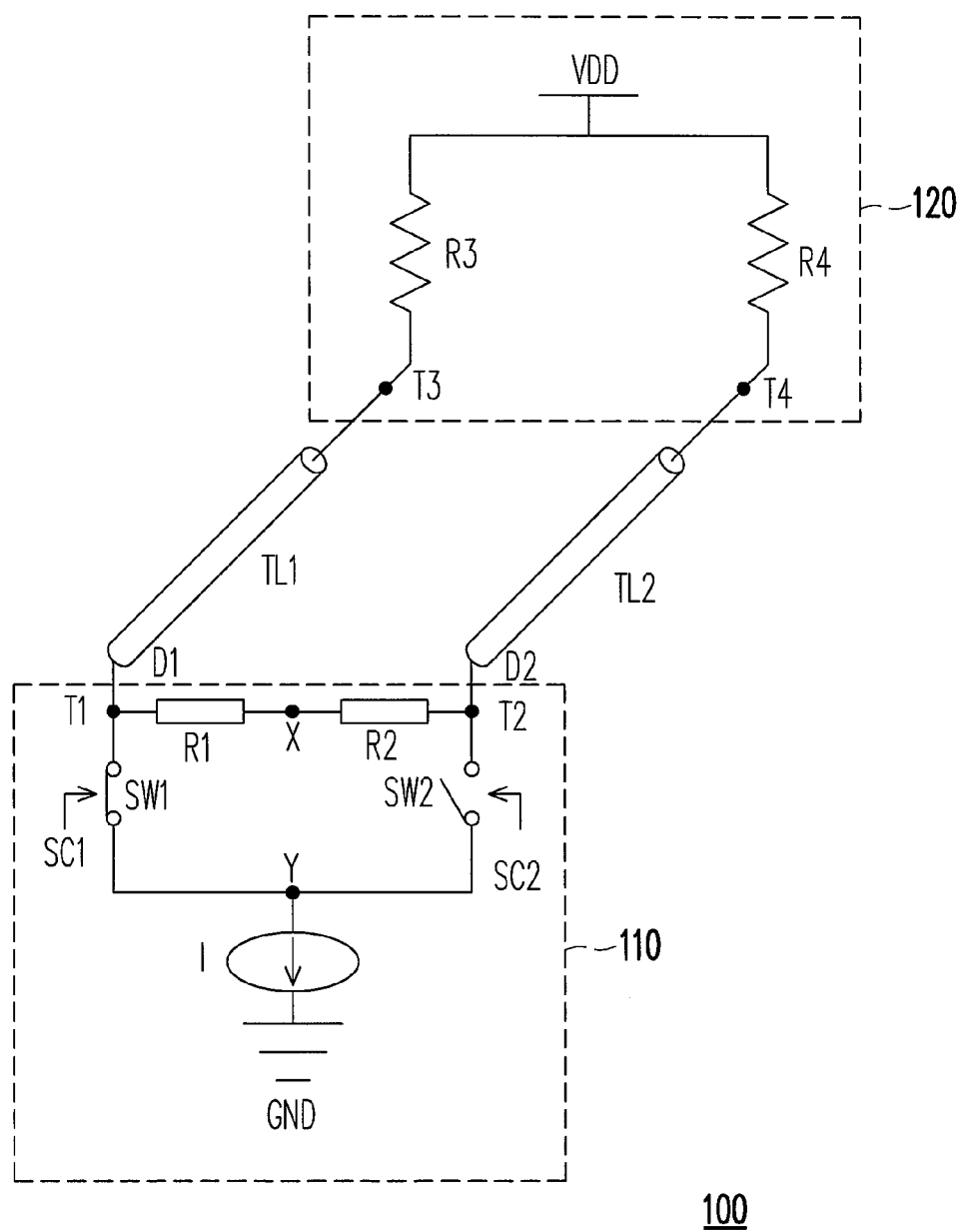
FIG. 1 is a schematic diagram of a high-definition multimedia interface (HDMI) data transceiving apparatus according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

In a high-definition multimedia interface (HDMI) data transceiving apparatus provided by the disclosure, when a data transmitter transmits data to a data receiver, the data transmitter is able to effectively absorb reflected waves and reduce voltage loss on transmission lines. Thus, the data transmission quality is improved. Embodiments of the disclosure will be described below in detail with reference to accompanying drawings.

FIG. 1 is a schematic diagram of a HDMI data transceiving apparatus according to an embodiment of the disclosure. As shown in FIG. 1, the HDMI data transceiving apparatus 100 in the present embodiment includes a data receiver 120 and a data transmitter 110. The data receiver 120 has data receiving terminals T3 and T4 and includes impedance-providing devices R3 and R4. The impedance-providing device R3 is coupled between the data receiving terminal T3 and a reference power supply VDD, and the impedance-providing device R4 is coupled between the data receiving terminal T4 and the reference power supply VDD. The data receiving terminals T3 and T4 of the data receiver 120 receive data transmitted by the data transmitter 110 through transmission lines TL1 and TL2.

On the other hand, the data transmitter 110 has data transmission terminals T1 and T2 which are respectively coupled to the data receiving terminals T3 and T4 of the data receiver 120 through the transmission lines TL1 and TL2. Thus, the data transmitter 110 transmits data through the data transmission terminals T1 and T2, and the transmitted data are sent to the data receiving terminals T3 and T4 of the data receiver 120 through the transmission lines TL1 and TL2.

The data transmitter 110 further includes switches SW1 and SW2 and a current source I. The switch SW1 has a first terminal, a second terminal, and a control terminal. The first terminal of the switch SW1 is coupled to the data transmission terminal T1, the second terminal of the switch SW1 is coupled to a node Y, and the control terminal of the switch SW1 receives a control signal SC1 to determine the on/off state of the switch SW1. The switch SW2 also has a first terminal, a second terminal, and a control terminal. The first terminal of the switch SW2 is coupled to the data transmission terminal T2, the second terminal of the switch SW2 is coupled to the node Y, and the control terminal of the switch SW2 receives a control signal SC2 to determine the on/off state of the switch SW2. In other embodiments, the switches SW1 and SW2 may be transistors, and any device offering the function of a switch falls within the scope of the disclosure. The current source I is serially connected between a reference ground terminal GND and the node Y. The current source I sinks a reference current from the second terminals of the switches SW1 and SW2 to the reference ground terminal GND.

In the present embodiment, the control signal SC1 for determining the on/off state of the switch SW1 and the control signal SC2 for determining the on/off state of the switch SW2 have reverse phases, and therefore the on/off states of the switches SW1 and SW2 are reverse to each other as well. As a result, when the switch SW1 in the data transmitter 110 is turned on according to the control signal SC1, the switch SW2 is turned off. Besides, the current source I in the data transmitter 110 sinks a current from the second terminal of the switch SW1 to the reference ground terminal GND. Thus, the data transmission terminals T1 and T2 of the data transmitter 110 transmits data D1 and D2 to the data receiving terminals T3 and T4 of the data receiver 120 respectively through the transmission lines TL1 and TL2. For instance, according to the control signals SC1 and SC2, when the switch SW1 is turned on and the switch SW2 is turned off, the data transmission terminal T1 of the data transmitter 110 transmits the data D1 (for example, logic 0) to the data receiving terminal T3 of the data receiver 120 through the transmission line TL1, and the data transmission terminal T2 of the data transmitter 110 transmits the data D2 (for example, logic 1) to the data receiving terminal T4 of the data receiver 120 through the transmission line TL2.

Similarly, when the switch SW1 in the data transmitter 110 is turned off according to the control signal SC1, the switch SW2 is turned on. Besides, the current source I in the data transmitter 110 sinks a current from the second terminal of the switch SW2 to the reference ground terminal GND. Thus, the data transmission terminals T1 and T2 of the data transmitter 110 transmit data D1 and D2 to the data receiving terminals T3 and T4 of the data receiver 120 respectively through the transmission lines TL1 and TL2. For instance, according to the control signals SC1 and SC2, when the switch SW1 is turned off, and the switch SW2 is turned on, the data transmission terminal T1 of the data transmitter 110 transmits the data D1 (for example, logic 1) to the data receiving terminal T3 of the data receiver 120 through the transmission line TL1, and the data transmission terminal T2 of the data transmitter 110 transmits the data D2 (for example, logic 0) to the data receiving terminal T4 of the data receiver 120 through the transmission line TL2.

It should be mentioned that the data transmitter 110 in an embodiment of the disclosure further includes impedance-providing devices R1 and R2. The impedance-providing device R1 has a first terminal and a second terminal. Here, the first terminal of the impedance-providing device R1 is coupled to the data transmission terminal T1, the second terminal of the impedance-providing device R1 is coupled to a node X, and the impedance provided by the impedance-providing device R1 may be 4 times the impedance on the transmission line TL1. The impedance-providing device R2 also has a first terminal and a second terminal. The first terminal of the impedance-providing device R2 is coupled to the data transmission terminal T2, the second terminal of the impedance-providing device R2 is coupled to the node X, and the impedance provided by the impedance-providing device R2 may be 4 times the impedance on the transmission line TL2. In the present embodiment, the impedance-providing devices R1 and R2 are implemented in form of resistors.

To be specific, in the present embodiment, when the data transmission terminals T1 and T2 of the data transmitter 110 transmit the data D1 and D2 to the data receiving terminals T3 and T4 of the data receiver 120 through the transmission lines TL1 and TL2, the impedance-providing devices R1 and R2 in the disclosure respectively produce the impedance matching effect on the transmission lines TL1 and TL2. Thus, the reflected waves generated by the HDMI data transceiving apparatus 100 during data transmission may be effectively absorbed, and voltage loss on the transmission lines TL1 and TL2 may be reduced. Accordingly, the data transmission quality may be improved, and transmission and reception of high-definition data may be accomplished.

Figure 2:
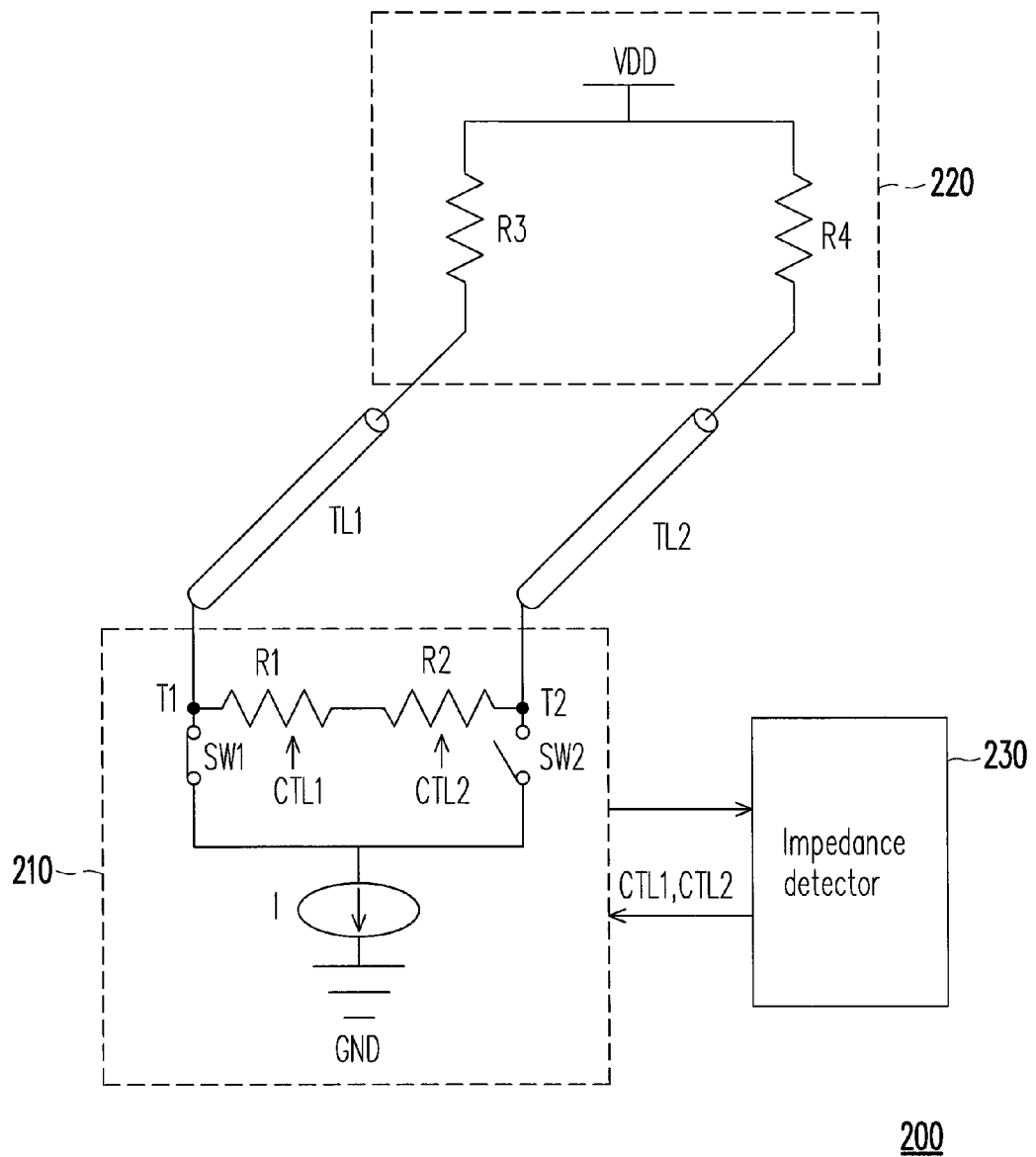
FIG. 2 is a schematic diagram of a HDMI data transceiving apparatus according to another embodiment of the disclosure.

FIG. 2 is a schematic diagram of a HDMI data transceiving apparatus 200 according to another embodiment of the disclosure. As shown in FIG. 2, the HDMI data transceiving apparatus 200 includes a data receiver 220, a data transmitter 210, and an impedance detector 230. The impedance detector 230 is coupled to the data transmitter 210. In the present embodiment, the impedance detector 230 detects the impedances on the transmission lines TL1 and TL2 and thereby generates a detection result. The impedance detector 230 also generates adjustment signals CTL1 and CTL2 according to the detection result. The data transmitter 210 receives the adjustment signals CTL1 and CTL2 and appropriately adjusts the impedances provided by the impedance-providing devices R1 and R2 according to the adjustment signals CTL1 and CTL2. Thereby, the impedance provided by the impedance-providing device R1 is greater than 4 times the impedance on the transmission line TL1, and the impedance provided by the impedance-providing device R2 is greater than the impedance on the transmission line TL2. In the present embodiment, the impedance provided by the impedance-providing device R1 may be 2-5 times the impedance on the transmission line TL1, and the impedance provided by the impedance-providing device R2 may be 2-5 times the impedance on the transmission line TL2.

Examples are provided below as to how the impedance detector 230 detects the impedances on the transmission lines TL1 and TL2. In the present embodiment, the impedance detector 230 turns on the switch SW1 and turns off the SW2 and calculates the impedance on the transmission line TL1 according to the voltage on the data transmission terminal T1. On the other hand, the impedance detector 230 turns on the switch SW2 and turns off the SW1 and calculates the impedance on the transmission line TL2 according to the voltage on the data transmission terminal T2. The impedance detector 230 detects the impedances on the transmission lines TL1 and TL2 and generates the corresponding adjustment signals CTL1 and CTL2 according to the detection result.

Under the mechanism of adjusting the impedances provided by the impedance-providing devices R1 and R2 according to the adjustment signals CTL1 and CTL2 generated by the impedance detector 230, the impedance-providing devices R1 and R2 may effectively produce the impedance matching effect respectively on the transmission lines TL1 and TL2 even though the impedances on the transmission lines TL1 and TL2 may be changed due to some other factors. Besides, the reflected waves generated by the HDMI data transceiving apparatus 200 during data transmission can still be effectively absorbed to improve the data transmission quality.

As described above, the HDMI data transceiving apparatus provided by the disclosure has at least following advantages:
1. the first impedance-providing device and the second impedance-providing device can effectively produce the impedance matching effect on the first transmission line and the second transmission line, and the reflected waves can be effectively absorbed to improve the data transmission quality.
2. under the adjustment of the impedance detector, the impedances provided by the first impedance-providing device and the second impedance-providing device can be appropriately adjusted to produce the impedance matching effect even though the impedances on the first transmission line and the second transmission line may be changed due to some other factors It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:
1. A high-definition multimedia interface (HDMI) data transceiving apparatus comprising:
a data receiver; and
a data transmitter, having a first data transmission terminal and a second data transmission terminal, wherein the first data transmission terminal transmits first data to the data receiver through a first transmission line, and the second data transmission terminal transmits second data to the data receiver through a second transmission line, the data transmitter comprising:
a first impedance-providing device, having a first terminal and a second terminal, wherein the first terminal of the first impedance-providing device is coupled to the first data transmission terminal of the data transmitter;
a second impedance-providing device, having a first terminal and a second terminal, wherein the first terminal of the second impedance-providing device is coupled to the second data transmission terminal of the data transmitter, and the second terminal of the second impedance-providing device is coupled to the second terminal of the first impedance-providing device;
a first switch, having a first terminal, a second terminal, and a control terminal, wherein the first terminal of the first switch is coupled to the first data transmission terminal of the data transmitter, and the first switch is turned on or off according to a first control signal received by the control terminal of the first switch;
a second switch, having a first ten terminal, a second terminal, and a control terminal, wherein the first terminal of the second switch is coupled to the second data transmission terminal of the data transmitter, the second terminal of the second switch is coupled to the second terminal of the first switch, and the second switch is turned on or off according to a second control signal received by the control terminal of the second switch; and
a current source serially connected to a reference ground terminal and the second terminal of the second switch, the current source sinking a reference current from the second terminal of the first switch and the second terminal of the second switch to the reference ground terminal.

2. The HDMI data transceiving apparatus according to claim 1 further comprises:
   an impedance detector coupling the data transmitter and generating a detection result to the data transmitter through detecting an impedance on the first transmission line and an impedance on the second transmission line, wherein the data transmitter adjusts an impedance provided by the first impedance-providing device and an impedance provided by the second impedance-providing device according to the detection result.

3. The HDMI data transceiving apparatus according to claim 1, wherein an on/off state of the first switch is the reverse of an on/off state of the second switch.

4. The HDMI data transceiving apparatus according to claim 1, wherein a phase of the first control signal is the reverse of a phase of the second control signal.

5. The HDMI data transceiving apparatus according to claim 1, wherein an impedance of the first impedance-providing device is greater than an impedance on the first transmission line.

6. The HDMI data transceiving apparatus according to claim 1, wherein an impedance of the second impedance-providing device is greater than an impedance on the second transmission line.

7. The HDMI data transceiving apparatus according to claim 1, wherein the data receiver comprises:
   a third impedance-providing device, coupled between the first transmission line and a reference power supply; and
   a fourth impedance-providing device, coupled between the second transmission line and the reference power supply.

* * * * *